(12) United States Patent
Girouard

(10) Patent No.: US 7,804,420 B2
(45) Date of Patent: Sep. 28, 2010

(54) LIGHT ASSEMBLY WITH SHIELDING DEVICE AND VISIBILITY WINDOW

(75) Inventor: John F Girouard, East Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 288 days.

(21) Appl. No.: 12/006,762

(22) Filed: Jan. 4, 2008

(65) Prior Publication Data

US 2009/0174541 A1     Jul. 9, 2009

(51) Int. Cl.
*G08B 1/00* (2006.01)
(52) U.S. Cl. .............. 340/815.4; 340/463; 340/466; 340/472; 116/28 R; 362/490; 362/543; 362/542; 362/546
(58) Field of Classification Search .......... 340/815.4, 340/463, 464, 467, 468, 471, 479, 472; 116/28 R, 116/63 R; 362/490, 503, 543
See application file for complete search history.

(56) References Cited

U.S. PATENT DOCUMENTS

| | | | |
|---|---|---|---|
| 6,511,216 B2 | 1/2003 | Strickland | 362/542 |
| 6,842,110 B2 * | 1/2005 | Quigley et al. | 340/468 |
| 7,106,185 B1 | 9/2006 | Neufeglise | 340/468 |
| 7,261,447 B2 | 8/2007 | Menke et al. | 362/503 |
| 7,352,278 B2 * | 4/2008 | Terzian | 340/471 |
| 7,404,372 B2 * | 7/2008 | Aasgaard | 116/28 R |
| 7,589,622 B2 * | 9/2009 | Farley | 340/468 |

OTHER PUBLICATIONS

Whelen Inner-Edge Undercover Super-LED Lighting Systems Information Brochure, 2007.

* cited by examiner

*Primary Examiner*—Davetta W Goins
(74) *Attorney, Agent, or Firm*—Alix, Yale & Ristas, LLP

(57) ABSTRACT

The present disclosure relates to an housing that reduces obstruction of the vehicle operator's ability to see through the upper portion of the windshield. Rather than a light shield constructed entirely of a opaque plastic, an interior mounted warning light assembly incorporates a visibility window above the vehicle operator's position. A cutout in the opaque casing material is fitted with a window of transparent one-way mirror material. The mirror coating faces the interior of the light assembly and acts as a shield by blocking flashback when the light assembly is activated, while simultaneously allowing the operator of the vehicle to see upwardly through it to the outside during normal vehicle operation.

19 Claims, 4 Drawing Sheets

LIGHT ASSEMBLY WITH SHIELDING DEVICE AND VISIBILITY WINDOW

BACKGROUND

Lights and light bar assemblies for use as warning signals by emergency vehicles such as police cars and ambulances are well established in the art. Traditionally, light assemblies for such vehicles have been mounted to the roof of the vehicle. The roof location and the associated designs accomplish the primary objective of ensuring excellent visibility of the warning signals to the surrounding public when the lights are activated. However, roof-mounted lighting assemblies have significant drawbacks, including interference with the aerodynamics of the vehicle, increased turbulence at high speeds, increased noise, interference with vehicle handling, increased height, and easy identification of law enforcement vehicles. Further, roof mounting generally requires drilling or similar penetration into the roof of the vehicle, consequently decreasing the vehicle's resale value.

Due to the aforementioned drawbacks of roof-mounted light assemblies, several alternative warning light designs have been developed through the years. Some alternative warning light designs include mounting to the vehicle bumper, incorporating warning lights into existing vehicle light fixtures, mounting on the exterior of side mirrors, and mounting on the interior windshield of the vehicle. Generally, lights mounted to the front and/or rear windshield of a vehicle have been a popular and effective alternative design. Such positioning enables excellent visibility of the activated lights to the public. However, interior-mounted warning light assemblies have their own drawbacks, most notably light flashback into the vehicle when the lights are activated. To eliminate the potential for flashback, interior windshield mounted light assemblies are fitted with an opaque casing or hood that surrounds the bottom and rear sides of the warning light, thus serving as a barrier between the activated lights and the interior of the vehicle. Two such designs are disclosed in U.S. Pat. No. 7,106,185 to Neufeglise and U.S. Pat. No. 6,511,216 to Strickland. Though these shielding devices effectively eliminate flashback, operators have complained that the opaque housings can impair visibility through the upper portion of the windshield, especially the ability to properly observe overhead traffic lights and high mounted street signs. It is therefore an object of the present disclosure to provide a new light assembly shielding device that significantly reduces or eliminates flashback while not impairing the vehicle operator's range of vision through the windshield.

SUMMARY

Aspects of the present disclosure relate to an improved housing that reduces obstruction of the vehicle operator's ability to see through the upper portion of the windshield. Rather than a light shield constructed entirely of opaque plastic, an interior mounted warning light assembly incorporates a visibility window above the vehicle operator's position. A cutout in the opaque casing material is fitted with a window of transparent one-way mirror material. The mirror coating faces the interior of the light assembly and acts as a shield by blocking flashback when the light assembly is activated, while simultaneously allowing the operator of the vehicle to see upwardly through it to the outside during normal vehicle operation.

DESCRIPTION OF THE PREFERRED EMBODIMENTS

Figure 1:
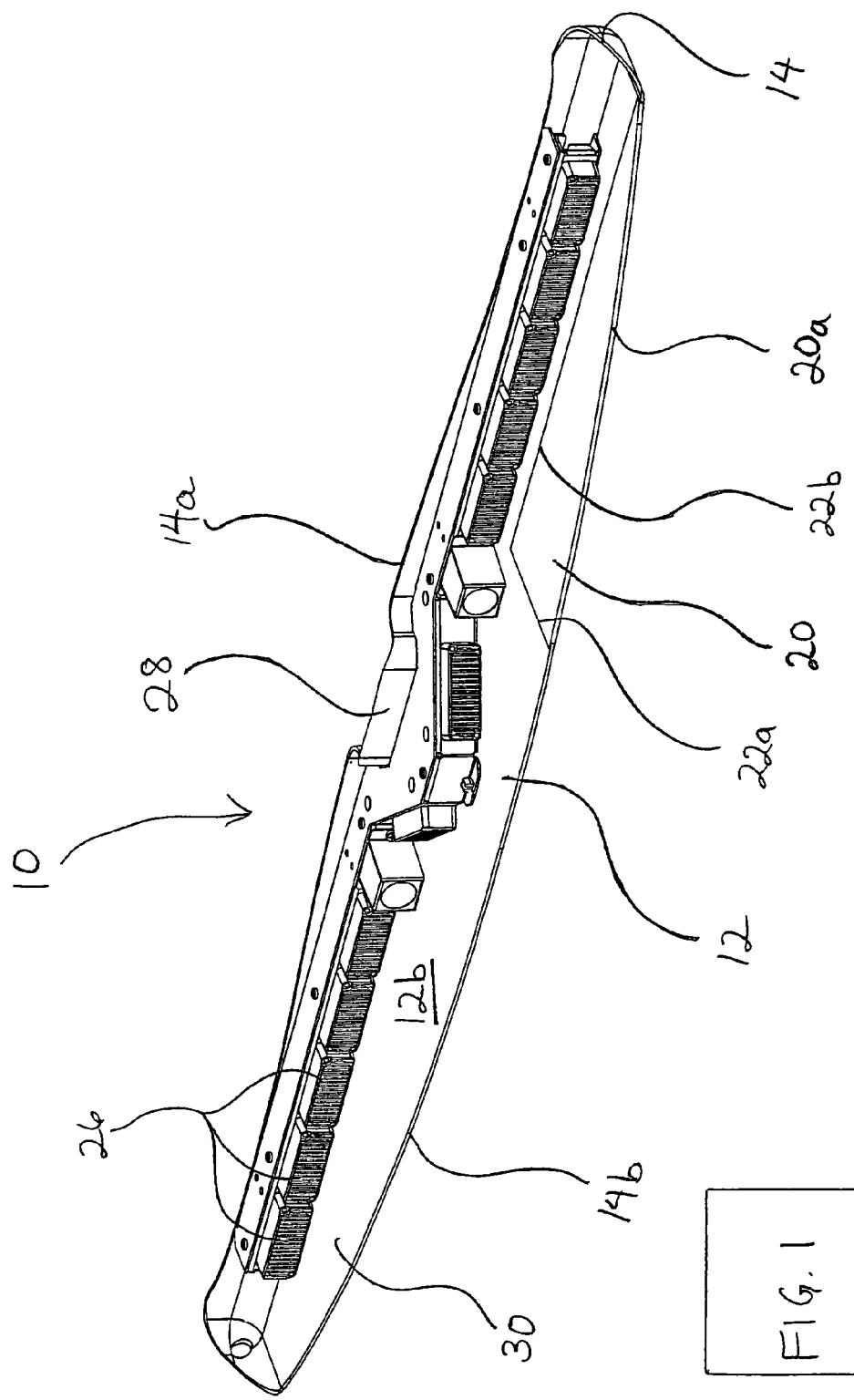
FIG. 1 is a perspective view of an interior light bar incorporating a shielding device according to a preferred embodiment.
Figure 2:
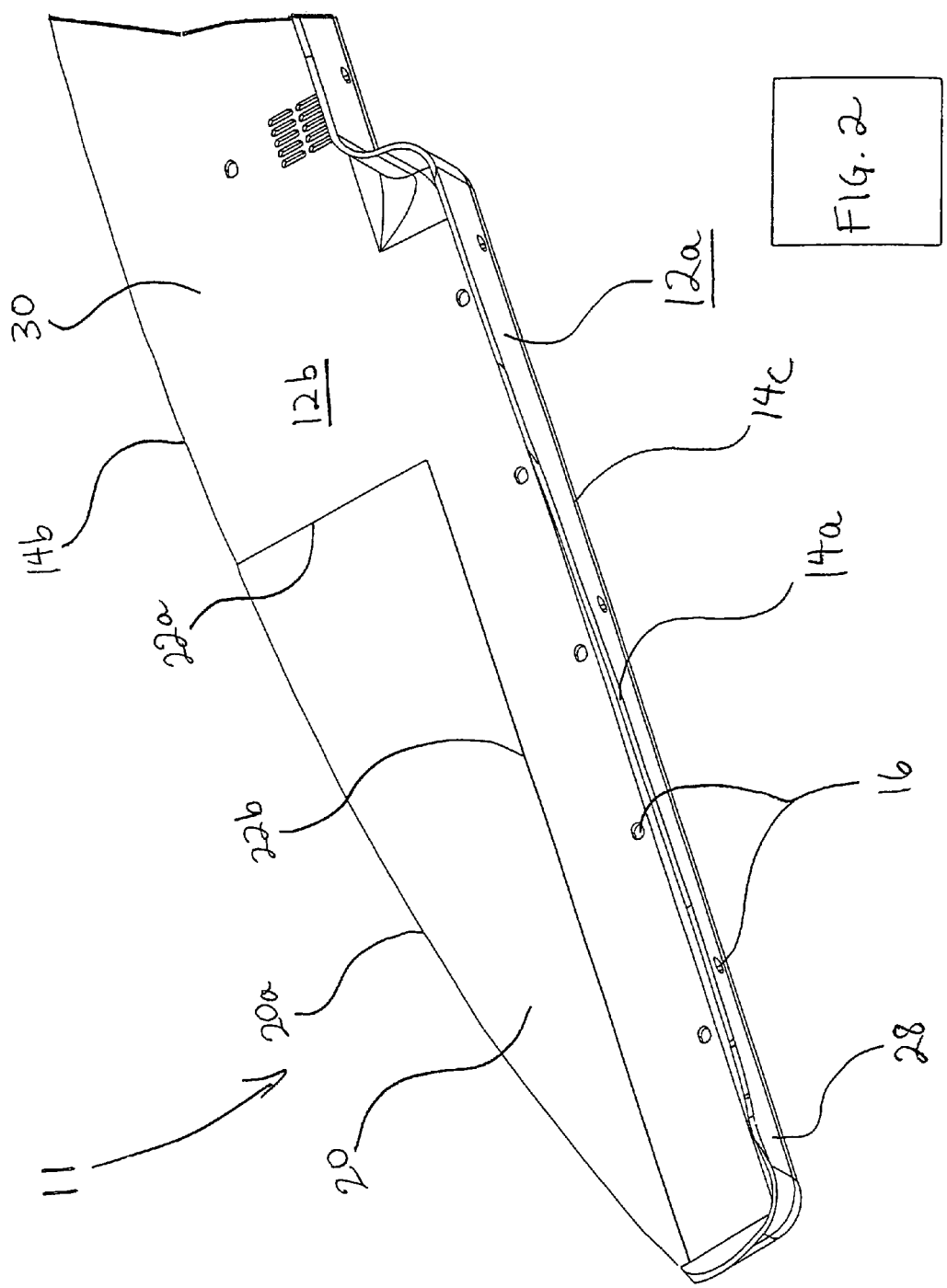
FIG. 2 is an enlarged perspective view of the shielding device of FIG. 1 showing the visibility window in greater detail.
Figure 4:
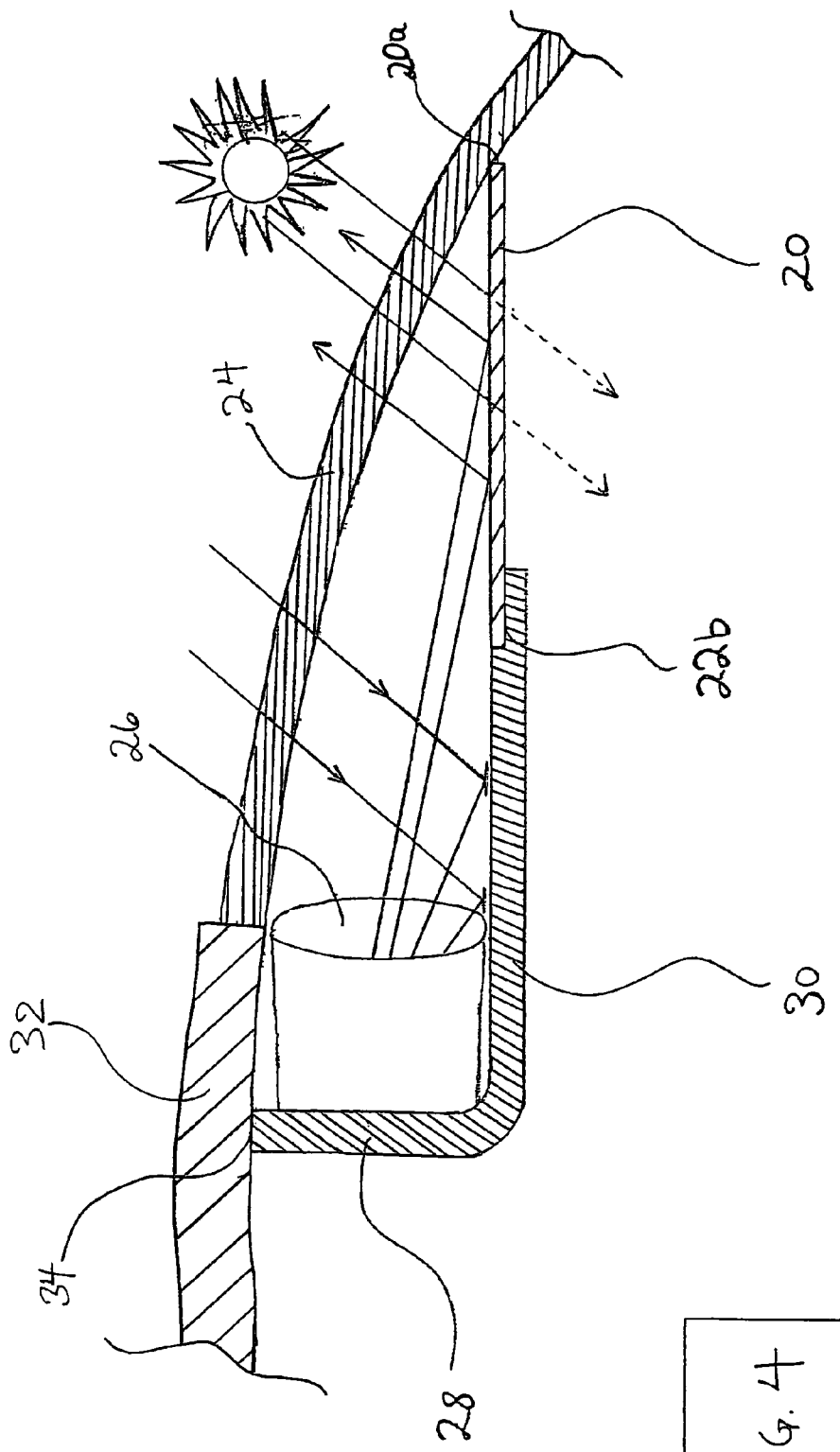
FIG. 4 is a cross sectional view of the shielding device installed in a vehicle as it is normally used.

As depicted in FIG. 1, warning light assembly 10 includes shielding device 11, a preferred embodiment of which generally includes body 12 and mirror sheet 20. Body 12 further includes exterior face 12a, interior face 12b and edge 14. When describing the light assembly 10, the "exterior" and "interior" designations are made with respect to the light assembly 10, rather than the vehicle. Consequently, body exterior face 12a faces the interior of the vehicle and body interior face 12b faces the inside of the windshield 24 in a typical installation. In the disclosed embodiment, body 12 comprises a single piece of plastic sheet material formed to the desired shape and specifically configured for a particular vehicle and light assembly 10. As FIGS. 1 and 4 show more clearly, body 12 further comprises generally vertical rear wall 28 and generally horizontal bottom wall 30 that meet at junction 14c. Rear wall 28 and bottom wall 30 lie generally perpendicular to each other; however rear wall 28 can transition into bottom wall 30 at a bend, yielding an junction 14c with a curved side profile, as shown in FIG. 4. In a preferred embodiment, the body comprises a single piece of polycarbonate thermoformed to the desired shape. While this embodiment features a single piece of formed plastic, other embodiments may be employed, including other non-translucent materials or joining multiple pieces of material.

When installed, the formed shape of body 12 substantially conforms to the shape of the vehicle's interior roof 32 and windshield 24. The configuration of body 12 creates an essentially complete barrier between the interior of the vehicle and the lightheads mounted within the warning light or light bar assembly 10. The disclosed body 12 further comprises holes 16 in various locations on body 12 for attaching the assembly 10 to the vehicle as well as securing components within the body 12.

When installed, the upper edge 14a of rear wall 28 meets the interior roof 32 of the vehicle. Similarly, curved forward edge 14b of bottom wall 30 abuts the vehicle's interior windshield. The upper and forward edges 14a and 14b are configured to conform to the interior of the roof 32 and windshield 24 to block light from the warning lights from reflecting back into the interior of the vehicle when the light assembly 10 is activated. The forward edge 14b may be provided with a gasket and/or adhesive (not shown) to ensure an accurate joint between the forward edge and the windshield.

According to aspects of the disclosure, a portion of the opaque bottom wall 30 of body 12 is removed in a location above the vehicle operator's position (driver's side). The removed portion of bottom wall 30 is replaced with an acrylic mirror sheet 20 of like shape having a reflective coating applied to the surface facing the interior of the warning light or light bar 10. One material that has proven acceptable is an acrylic mirror sheet comprising, at minimum, approximately 98 weight percent polymethyl methacrylate (PMMA); maximum 0.5 weight percent methyl methacrylate (MMA); maximum 0.1 weight percent aluminum; and 1.5 weight percent paint. This product provides a "one way" mirror effect, allowing the vehicle operator to see upwardly through the opening in the housing covered by the mirror sheet 20, while limiting flashback to acceptable levels. While this particular mirror sheet has proven effective, it should be realized that any other composition that results in a similar "one way" effect can be utilized.

Figure 3A:
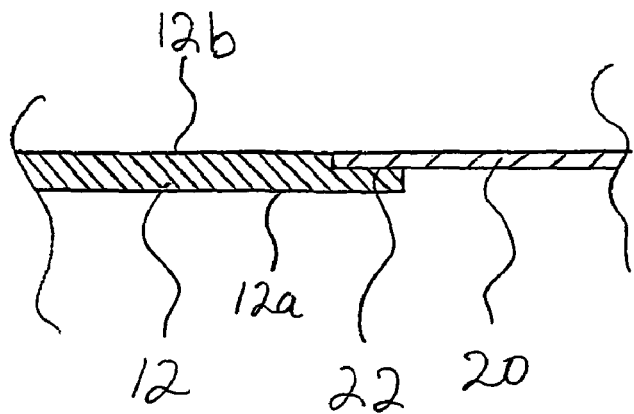
FIGS. 3A-3C are cross sectional views of the joint between the visibility window and opaque body according to various embodiments.
Figure 3B:
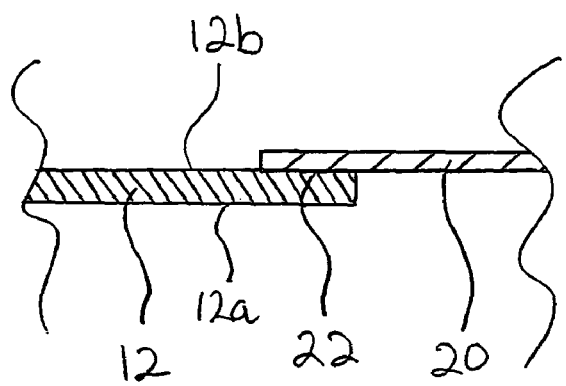
Figure 3C:
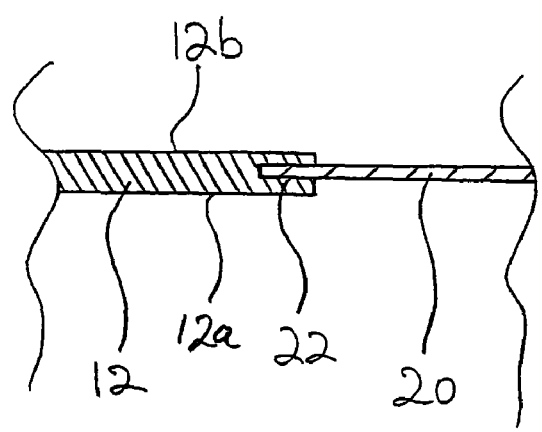

As shown in greater detail in FIG. 3A, mirror sheet 20 is attached to grooves 22a and 22b in bottom wall 30 by adhesive or other attachment means to ensure a flush, gap-free contact. Additionally, as depicted in FIG. 4, mirror sheet edge 20a abuts and conforms substantially to the shape of the vehicle's inner windshield, much like curved forward edge 14b. While this embodiment features a recess in bottom wall 30 defining grooves 22a and 22b, it should be clear that the invention may be implemented using other groove configurations, including a U-shaped channel (FIG. 3C) or fastening mirror sheet 20 directly to the flat edge of interior face 12b (FIG. 3B).

A shielding device according to the disclosure has been evaluated by at least one police officer under various conditions. During daylight hours, the visibility window allowed the officer to see all colors on traffic control signals and clearly read overhead street signs. When warning lights were activated, no flashback was experienced and vehicles were clearly alerted. Identical results were experienced during dark hours. In summary, the described approximate composition has demonstrated both excellent transparency when looked through from the interior of the vehicle and exceptional flashback-preventing properties. Consequently, the disclosed shielding device provides a visibility window for the operator while simultaneously preventing flashback from activated lights in a windshield-mounted light assembly.

While a preferred embodiment has been described, it should be appreciated that various equivalents, alternatives and modifications are possible within the scope of the claimed coverage.

What is claimed is:

1. A warning light assembly for mounting inside a vehicle having a roof structure and a windshield having an interior surface, said warning light assembly comprising:
    a housing including a rear wall and a bottom wall, said rear wall and bottom wall having inside and outside surfaces, at least a portion of said rear wall being substantially perpendicular to said bottom wall, the inside surfaces of said rear wall and bottom wall defining an interior space;
    at least one warning light mounted in said interior space and having a direction of light emission generally parallel to said bottom wall and generally perpendicular to said rear wall; and
    a plurality of brackets configured to engage said housing and said roof structure to support said warning light assembly against the interior surface of said windshield with said direction of light emission oriented outwardly through said windshield,
    wherein said bottom wall comprises a substantially transparent portion arranged to permit light passing through said windshield from outside the vehicle to also pass through said bottom wall.

2. The warning light assembly of claim 1, wherein said substantially transparent portion comprises an inside surface facing said interior space, said transparent portion inside surface including a reflective coating.

3. The warning light assembly of claim 1, wherein said substantially transparent portion comprises a reflective coating facing said interior space, said reflective coating arranged to reflect light from said at least one warning light outwardly through said windshield.

4. The warning light assembly of claim 1, wherein the substantially transparent portion comprises at least approximately 98 weight percent polymethyl methacrylate, no more than approximately 0.5 weight percent methyl methacrylate, no more than approximately 0.1 weight percent aluminum, and no more than approximately 1.5 weight percent paint.

5. The warning light assembly of claim 1, wherein the vehicle has a driver's side and said substantially transparent portion is positioned substantially above said driver's side.

6. The warning light assembly of claim 1, wherein the rear wall has a top edge that substantially conforms to the shape of said interior roof and the bottom wall has a front edge that substantially conforms to the shape of said interior surface of the windshield.

7. The warning light assembly of claim 1, wherein the housing is constructed from a single piece of thermoformed polycarbonate with a portion of the bottom wall corresponding substantially to the shape of the substantially transparent portion removed and replaced with a one-way mirrored sheet of substantially like shape.

8. The warning light assembly of claim 7, wherein the polycarbonate portion of the bottom wall is fit with recesses that define an attachment groove along the edges of said polycarbonate portion that outline the substantially transparent portion of the housing and the corresponding edges of the one-way mirrored sheet are placed into said groove and attached to the polycarbonate.

9. The warning light assembly of claim 1, wherein the substantially transparent portion permits between approximately 20 percent and 80 percent of the light passing through said windshield from outside the vehicle to pass through said bottom wall.

10. The warning light assembly of claim 6, wherein the top edge of the rear wall abuts the roof of the vehicle and defines a roof junction and the front edge of the bottom wall abuts the interior surface of the windshield and defines a windshield junction, said roof junction and said windshield junction being substantially flush.

11. A method of reducing visual obstruction in a vehicle equipped with at least one warning light mounted inside the vehicle, said vehicle having an interior, an exterior, a roof, and a windshield with an interior surface, the warning light configured for mounting against the interior surface of the windshield to emit light outwardly through said windshield to the vehicle's exterior, said method comprising:
    providing a housing disposed between said at least one warning light and the interior of the vehicle, the housing including a rear wall and a bottom wall defining a space in which said at least one warning light is mounted;
    placing a substantially transparent window in said bottom wall arranged to permit light passing through said windshield from outside the vehicle to also pass through said housing to the interior of the vehicle.

12. The method of claim 11, said step of placing a substantially transparent window in the bottom wall comprising applying a reflective coating that faces the interior space on the substantially transparent portion.

13. The method of claim 12, said step of placing a substantially transparent window in the bottom wall comprising arranging said reflective coating to reflect light from said at least one warning light outwardly through said windshield.

14. The method of claim 11, further comprising rigidly attaching the housing to the roof of the vehicle.

15. The method of claim 14, said step of rigidly attaching the housing to the roof of the vehicle comprising attaching the housing to the vehicle roof via a plurality of brackets.

16. A housing for blocking flashback from at least one warning light mounted inside a vehicle, said vehicle having an interior, an exterior, a roof, and a windshield having an interior surface, said housing comprising:

a rear wall and a bottom wall, said rear wall and bottom wall having inside and outside surfaces, the inside surfaces of said rear wall and bottom wall defining an interior space;

wherein said at least one warning light is positioned within said interior space and arranged to emit light outwardly through said windshield to the vehicle's exterior and said bottom wall comprises a substantially transparent portion arranged to reflect light from said at least one warning light away from the interior of the vehicle while permitting light passing through said windshield from outside the vehicle to pass through said bottom wall.

17. The housing of claim 16, wherein the substantially transparent portion comprises an inside surface facing said interior space, said transparent portion inside surface including a reflective coating.

18. The housing of claim 16, wherein the substantially transparent portion comprises a reflective coating facing said interior space, said reflective coating arranged to reflect light from said at least one warning light outwardly through said windshield.

19. The housing of claim 16, further comprising a plurality of brackets configured to engage said housing and said roof to support said housing and said at least one warning light positioned in said interior space against the interior surface of said windshield.

* * * * *